US005813109A

United States Patent [19]

Ziegler et al.

[11] Patent Number: 5,813,109

[45] Date of Patent: Sep. 29, 1998

[54] IMPACT/NO-IMPACT PUNCHDOWN TOOL FOR USE WITH CUT/NO-CUT OR WIRE INSERTION BLADE ASSEMBLY

[75] Inventors: Daniel L. Ziegler, Newhall; Michael M. Fallandy, Ventura, both of Calif.

[73] Assignee: Harris Corporation, Melbourne, Fla.

[21] Appl. No.: 786,233

[22] Filed: Jan. 21, 1997

[51] Int. Cl.[6] .................... B23P 23/00

[52] U.S. Cl. .................... 29/566.4; 7/107; 29/751

[58] Field of Search .................... 29/33 M, 566, 29/566.1, 566.2, 566.3, 566.4, 750, 751, 752, 758; 7/107

[56] References Cited

U.S. PATENT DOCUMENTS

| | | | |
|---|---|---|---|
| 3,896,534 | 7/1975 | Kaufman et al. | 29/566.4 |
| 4,161,061 | 7/1979 | Mason et al. | 29/566.4 |
| 4,194,256 | 3/1980 | Knickerbocker | 29/566.4 |
| 4,241,496 | 12/1980 | Gregson | 29/751 |
| 4,408,391 | 10/1983 | Pohl | 29/751 |
| 4,434,542 | 3/1984 | Forberg et al. | 29/566.4 |
| 4,567,639 | 2/1986 | Fasano | 29/566.4 |
| 4,656,725 | 4/1987 | Knickerbocker | 29/566.4 |
| 4,696,090 | 9/1987 | Gregson et al. | 29/566.4 |
| 5,175,921 | 1/1993 | Krietzman | 29/566.4 |
| 5,195,230 | 3/1993 | Krietzman | 29/566.4 |

*Primary Examiner*—A. L. Pitts
*Assistant Examiner*—Christopher Kirkman
*Attorney, Agent, or Firm*—Charles E. Wands

[57] ABSTRACT

A wire-insertion and/or cutting tool comprises a handle having an axial bore, in which a wire-insertion and cutting blade assembly holder is installed. A wire-insertion and/or cutting blade assembly is inserted into the holder in a selected one of a plurality of blade assembly insertion orientations. The blade assembly includes a wire-insertion and/or cutting blade, that is configured to engage a wire to be inserted into a terminal block, and is operative to either seat, or to both seat and cut the wire in accordance with the selected blade assembly configuration and its insertion orientation. The blade assembly may include a rotatable cutting blade, and the holder configured to rotate the cutting blade and cut a wire engaged thereby for a first insertion orientation of the blade relative to the holder, but to prevent the cutting blade from rotating for a second insertion orientation of the blade assembly relative to the holder. The handle may also include a spring-loaded, axially translatable, impact hammer mechanism, that is selectively operative to impart an impact force to the holder, and thereby cause the blade assembly to seat/cut the wire.

24 Claims, 6 Drawing Sheets

IMPACT/NO-IMPACT PUNCHDOWN TOOL FOR USE WITH CUT/NO-CUT OR WIRE INSERTION BLADE ASSEMBLY

FIELD OF THE INVENTION

The present invention relates in general to wire insertion tools of the type employed in the telephone industry for seating and/or cutting the free end of a telephone wire into a terminal block of a telephone office mainframe. The invention is particularly directed to a new and improved impact wire-insertion and cutting tool having a wire-insertion and/or cutting blade assembly holder, in to which a wire-insertion and/or cutting blade assembly is insertible, so as to engage and controllably to cut a wire in accordance with the orientation of the blade assembly as inserted into the holder.

BACKGROUND OF THE INVENTION

The telephone industry currently offers its craftspersons a variety of wire seating/cutting tool configurations, including both impact mechanism-based and manual force-based units, for cutting and seating individual telephone wires in terminal blocks that are mounted to telephone office mainframe units. A typical impact mechanism-based tool has a generally longitudinal handle containing an axially translatable hammer element, which is biased by a compression spring to strike a wire seating and cutting head that extends from the foreword end of the handle, so as to seat and/or cut a wire that has been inserted into a wire capture and gripping end region of the head. For a non-limiting illustration of documentation describing examples of impact mechanism-based tools, attention may be directed to U.S. Pat. Nos. 5,195,230, 4,696,090, 4,567,639, and 4,241,496 and the patents cited therein.

While an impact mechanism-based tool facilitates uniform installation/cutting of a wire, in some applications, particularly those employing less robust terminal blocks, a manual force-based wire insertion and cutting tool is preferred, in order to avoid damage to the terminal block and wires that might otherwise occur if an impact hammer-based tool were employed. In order to be able to service a wide variety of terminal blocks, it is customary practice for the craftsperson to carry different types of manual force-based wire insertion and cutting (scissor) tools, each of which has a blade (typically permanently fixed into the handle) that is designed for a specific type of terminal block.

In an effort to reduce this equipment inventory requirement, at least one manufacturer (e.g., Harris Dracon) currently manufactures a universal type of impact mechanism-based tool, such as its Model D814 automatic impact tool. Such a tool is configured to interface with and provide an impact force to whatever type of wire insertion blade head is attached to the forward end of the handle, so that the impact mechanism is independent of the blade head configuration.

While such a tool offers a substantial improvement over dedicated blade tool configurations, its use is limited by the fact that the blade heads currently offered for attachment to such a universal type of tool are configured for either insertion mode only (namely, they only insert, but do not cut the wire once seated), or for insertion and cutting mode (in which they both seat in the terminal block and cut the wire). Moreover, because this type of tool is an impact tool it cannot be used where a manual force-based application, described above.

Further, those manufacturers which offer blade heads that can be used for both insertion and cutting mode applications provide a tool that has a custom integrated impact handle and wire installation head arrangement, in which the handle contains a uniquely configured control mechanism that engages a specially designed head to selectively execute the desired operation. However, since such a handle is not universal, it cannot be used with other types of heads, and the fundamental problem described above remains.

SUMMARY OF THE INVENTION

In accordance with the present invention, the above described deficiencies of conventional wire insertion tools (including both non-impact and impact designs) are effectively obviated by a new and improved 'broad spectrum' wire-insertion and cutting tool, that is configurable as either an impact or manual force based device, and will accept a variety of different types of blades, each of which is configured to either seat only, or seat and cut wire.

For this purpose, the wire insertion and cutting tool of the invention includes a handle having a longitudinal axial bore defined by molded interior walls and being sized to receive an axially translatable wire-insertion and cutting blade assembly holder, that projects from a forward end of the handle. The handle's axial bore is sized to accommodate a spring-loaded, axially translatable, impact hammer mechanism, which is selectively operative, in accordance with the position of a multi-position switch, in the form of a rotatable stop knob, to impart an impact force along the axis of the handle to a solid shaft portion of the blade assembly holder. Alternatively, the hammer mechanism can be omitted, so that the tool can be operated in a manual force mode only.

For accommodating the hammer impact mechanism, the interior architecture of the handle has spaced apart wall sections that are sized to accommodate a main impact spring and a hammer for translational movement along the axis of the handle. On opposite, outer sides of the wall sections, the handle stores a wire-grabbing hook and a spudger, that may be pivoted outwardly of the handle. The hammer itself has a side bore that is sized to receive a release pin and a release pin spring. The release pin has a transverse bore that becomes aligned with the hammer bore, when the release pin is translated into the side bore as a result of a tapered surface portion of the release pin sliding along a tapered region of the wall portion, and reaching a firing position trigger stop. The release pin travels along the tapered region of the wall portion, which compresses the hammer spring, in response to axial pressure being manually applied to the handle against the terminal block by the craftsperson.

When the release pin becomes aligned with the hammer's axial bore, allowing entry of the solid shaft portion of the holder, the hammer 'fires', so as to be rapidly axially translated by the main impact spring toward the front end of the handle, bringing its hammer surface into contact with the tool holder. Depending upon the type and orientation in which the tool blade assembly has been inserted into the holder, the wire will be both seated and cut, or simply seated in the terminal block.

A forward wall portion of the handle defines a blade assembly holder cavity. A holder return spring surrounds a blade assembly-receiving portion of the holder, and is operative to urge the holder in the forward axial direction of the tool. The forwardmost axial position of the holder is limited by a forward annular edge surface of the tool blade-receiving portion of the holder abutting against a wall portion of the interior structural configuration of the handle.

A first side of a tool blade-receiving portion of the holder has a generally planar surface, and a horizontal ledge parallel to the axis of the tool. Inserting a scissors type of blade assembly into the axial bore in a first insertion orientation, such that a rotatable cutting blade of the blade assembly is juxtaposed to the planar surface of the holder, defines a 'no-cut' configuration of the scissors blade assembly. This no-cut orientation of the scissors blade assembly allows the planar surface of the holder and a rotatable cutting blade of the scissors blade assembly to move past one another, while the horizontal ledge confines the movement of the rotatable cutting blade to a direction that is parallel to the tool axis, and thereby prevents rotation of the cutting blade.

A cylindrically configured surface of an opposite side of the tool blade-receiving portion of the holder intersects a generally flat surface along a tapered edge. This tapered edge defines a cutting blade rotation guide ramp for an interior edge region of the rotatable cutting blade, and causes the scissor cutting blade to rotate past a stationary blade of the cutting blade assembly, severing the wire, during relative axial translation between the cutting tool holder and the scissor blade assembly, for a 'cut' mode of operation of the tool.

The rotatable scissor cutting blade also includes a pawl, which passes through a slot in the blade assembly holder and is engaged by a forward end of a spring-biased, blade assembly locking clip, that is pivotably mounted to a respective half-handle. A like locking clip is mounted to the other half-handle, so that a fully assembled handle contains a pair of locking clips on opposite sides of the forward end of the handle. The forward end of the locking clip is engaged by the pawl, when the locking clip is biased into its blade assembly-locking condition. By squeezing the locking clip, the craftsperson can readily remove a blade assembly, and insert a blade assembly in a selected orientation that defines whether the scissor blade assembly will operate in a cut or no-cut mode.

The tool will also accept a no-cut, wire-insertion type of tool blade assembly having no rotatable scissor blade. Instead, it has a generally elongated, rectangular C-shaped wire insertion and seating blade head, which is solid with and projects from a generally cylindrically shaped neck portion of the blade assembly. In order to seat a wire and engage a terminal block, the wire insertion and seating blade head has an end slot and a deeper elongated U-shaped channel orthogonal to the end slot. The blade's neck portion is solid with a base from which the generally cylindrical shank portion extends. The base of the blade assembly includes a pawl, which is engageable by a forward end of one of the two blade locking clips, for locking the blade assembly into the holder bore for either of two 180° rotationally offset orientations in which the tool blade assembly may be been inserted into the holder.

DETAILED DESCRIPTION

Figure 1:
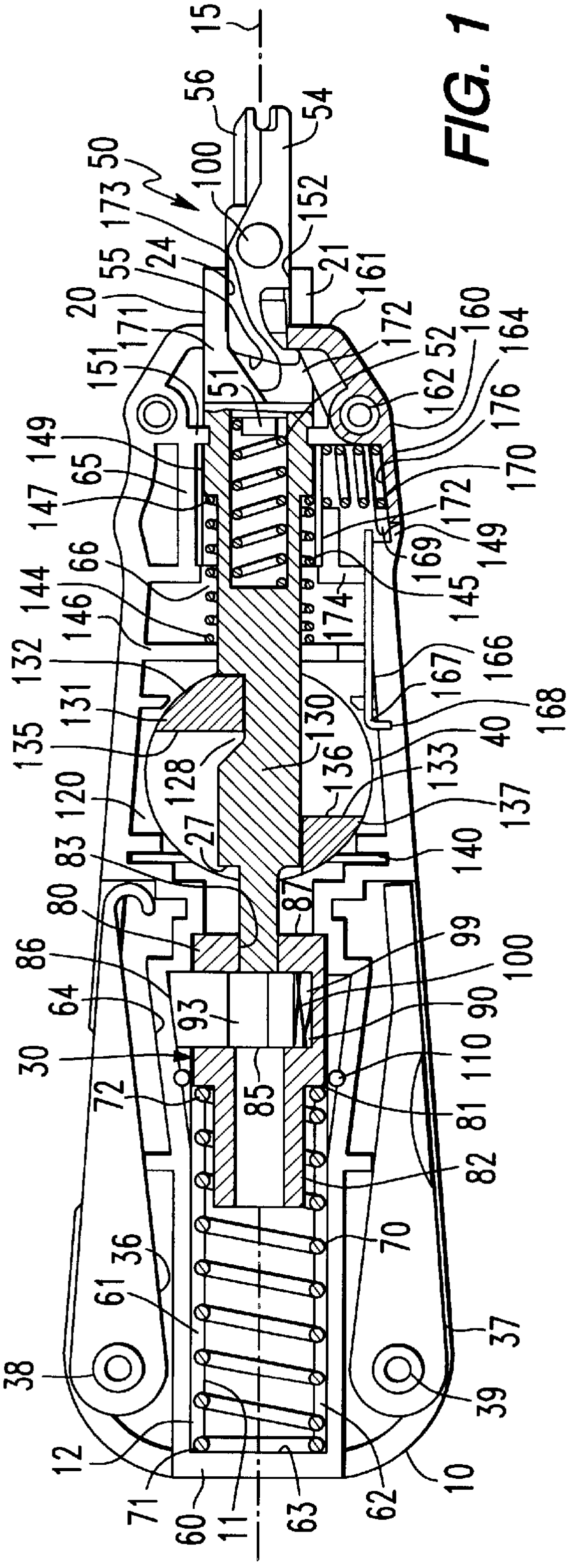
FIG. 1 is a diagrammatic side sectional view of a spring-loaded, impact hammer mechanism-operated wire-insertion and cutting tool in accordance with a first embodiment of the present invention.
Figure 2:
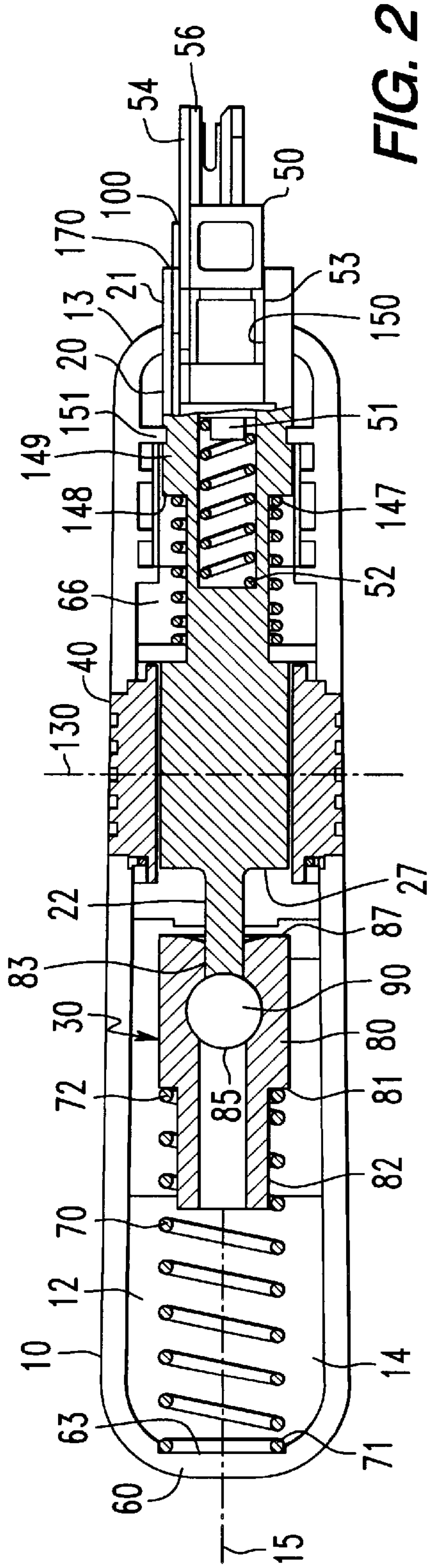
FIG. 2 is a diagrammatic top sectional view of the wire-insertion and cutting tool of FIG. 1.
Figure 3:
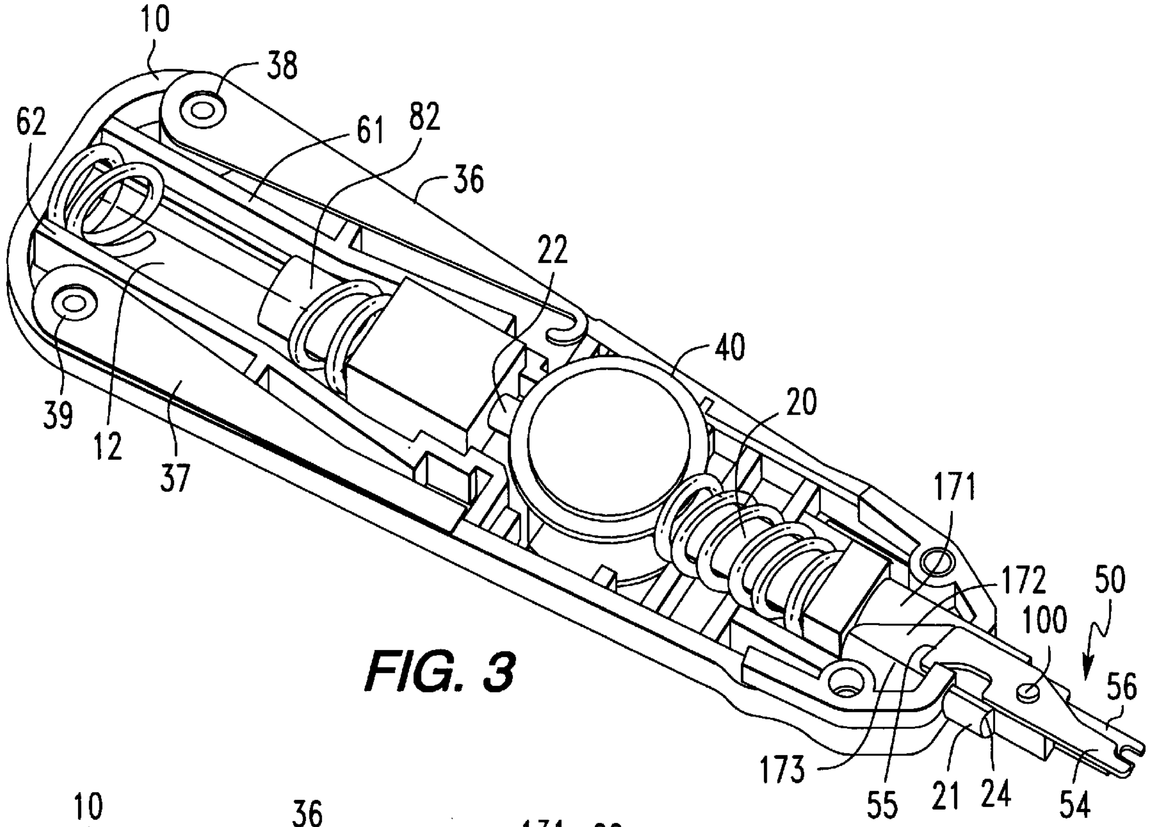
FIG. 3 is a diagrammatic perspective sectional view of the wire-insertion and cutting tool of FIG. 1.

A first, spring-loaded, impact hammer mechanism-operated embodiment of the wire-insertion and cutting tool in accordance with the present invention will now be described with reference to FIGS. 1–5. As shown therein, the tool includes a handle 10 having a longitudinal axial bore 12, that is defined by molded interior walls 11, and is sized to receive an axially translatable wire-insertion and cutting blade assembly holder 20. To facilitate manufacture and assembly, the handle 10, which is preferably made of a rugged industrial plastic, may comprise a pair of complementarily configured half-handle body portions, which are joined together by screws inserted through bores in the handle body halves, after the internal components of the tool have been placed into interior cavity regions of the respective handle halves, as is customary practice in the art.

The wire-insertion and cutting blade assembly holder 20 is retained in the handle's axial bore 12, such that a tool blade assembly-receiving portion 21 of the holder projects from a forward end 13 of the handle 10. An interior rear end portion 14 of the axial bore 12 is sized to accommodate a spring-loaded, axially translatable, impact hammer mechanism 30. In accordance with a first embodiment of the invention, the impact hammer mechanism 30 is selectively operative, in accordance with the operation of a switch, configured as a rotationally adjustable stop 40, to impart an impact force along the axis 15 of the handle 10 to a solid shaft portion 22 of the tool blade assembly holder 20. This hammer-impact action causes a tool blade assembly that has been inserted into a bore 24 of the tool blade receiving portion 21 of the holder 20 to seat a wire engaged by the blade assembly. The tool blade assembly may comprise either a scissors-configured, cut/no-cut type of tool blade assembly 50 shown in FIGS. 5 and 5A, or a no-cut, wire-insertion type of tool blade assembly 250 shown in FIGS. 18–20. For the case of the cut/no-cut type of tool blade assembly of FIGS. 5 and 5A, the hammer impact action may cause the wire to be cut or severed by the tool blade assembly depending upon the installed orientation of the tool blade assembly 50 relative to the holder bore 24.

The choice of blade used will depend upon the type of terminal block with which the tool is used. This significantly reduces the equipment inventory requirements of the craftsperson. Rather than having to carry a large number of complete tools, one needs only keep an inventory of the different types of blade assemblies that may be required for the various terminal blocks to be serviced.

The interior wall configuration of the handle has a first, hammer wall portion 60 having spaced apart wall sections 61 and 62, which are sized to accommodate therebetween a main impact spring 70 and hammer 80 of the hammer impact mechanism 30 for translational movement along the axis 15 of the handle. On opposite, outer sides of the wall sections 61 and 62, a wire-grabbing hook 36 and a spudger 37 are pivotably retained by respective rivets 38 and 39.

A first end 71 of the main impact spring 70 abuts against a rear end portion 63 of the handle, and a second end 72 of the spring 70 abuts against a generally annular surface region 81 of the hammer 80, such that the spring 70 surrounds a sleeve portion 82 of the hammer 80. An axial bore 83 extends through the hammer 80, and is sized to accommodate entry therein of the solid shaft portion 22 of the blade assembly holder 20.

The hammer 80 has a side bore 85 that is sized to receive a release pin 90 and a release pin spring 99 that is seated at the bottom of the bore 85. The release pin 90 itself has a transverse bore 93 that is sized the same as axial bore 83 of the hammer 80. The release pin's transverse bore 93 becomes aligned with the hammer bore 83, when the release pin is translated into the side bore 85 as a result of a tapered surface portion 86 of the release pin sliding along a tapered region 64 of the hammer wall portion 60, and reaching a firing position trigger post or stop 110. The release pin 90 is caused to travel along the tapered region 64 of the hammer wall portion 60, which compresses the hammer spring 70, in response to axial pressure being manually applied to the handle against the terminal block by the user.

Figure 5:
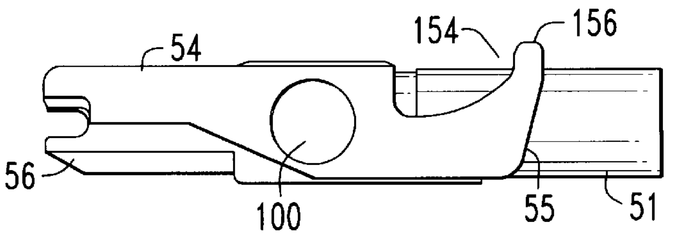
FIG. 5 is a diagrammatic side view of a cut/no-cut scissors-type cutting blade assembly usable in the wire-insertion and cutting tool of the invention.
Figure 5A:
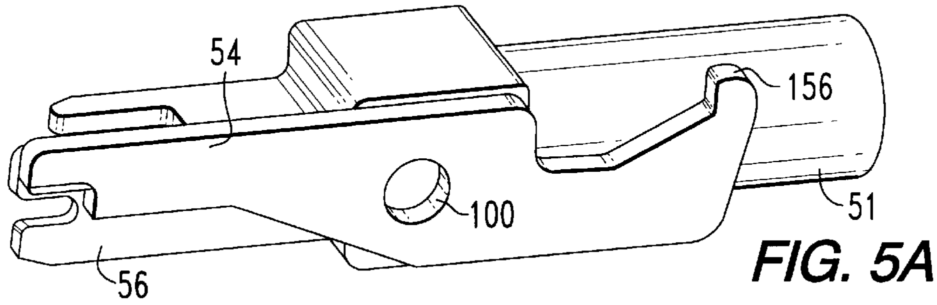
FIG. 5A is a diagrammatic perspective view of the cut/no-cut scissors-type cutting blade assembly of FIG. 5.
Figure 18:
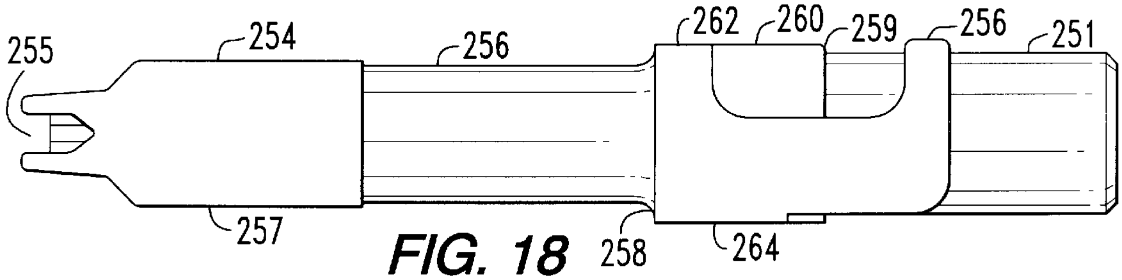
FIG. 18 is a diagrammatic top view of a no-cut, wire insertion blade assembly for use in the wire-insertion and cutting tool in accordance with the present invention.
Figure 19:
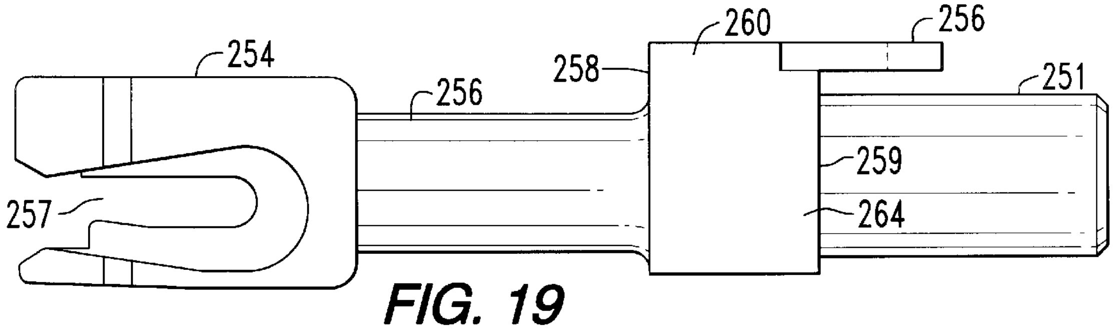
FIG. 19 is a diagrammatic side view of the no-cut, wire insertion blade assembly of FIG. 18.
Figure 20:
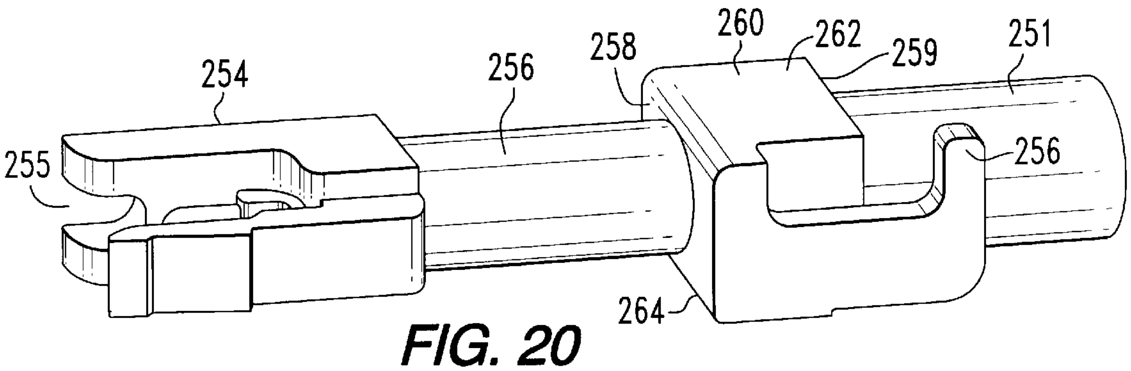
FIG. 20 is a diagrammatic perspective view of the no-cut, wire insertion blade assembly of FIGS. 18 and 19.

Namely, the firing position trigger post 110 limits rearward movement of the release pin to a point at which the bore 93 in the release pin 90 becomes aligned with the axial bore 83 of the hammer 80, allowing entry therein of the solid shaft portion 22 of the holder 20, causing the solid hammer to 'fire'. When the hammer 80 fires, it is rapidly axially translated by the main impact spring 70 toward the front end of the handle bringing its hammer surface 87 into contact with an annular surface 27 of the blade assembly holder 20. As will be described, where the scissors-configured, cut/no-cut blade assembly 50 of FIGS. 5 and 5A is employed, the wire will be either seated and cut, or only seated in the terminal block, based upon the orientation in which the tool blade assembly 50 has been inserted into the holder 20. Where a no-cut blade assembly of FIGS. 18–20 is used, the wire will be only seated in the terminal block, into the holder bore 24, for either of its two (180° offset) orientations in which the tool blade assembly 250 may be inserted into the holder 20.

The interior wall configuration of the handle 10 also includes a multi-position stop-retaining cavity 120, which is sized to accommodate a generally circular multi-position stop mechanism or knob 40. Multi-position knob 40 is rotatable about an axis 130 generally orthogonal to the handle axis 15, and is configured to selectively engage and lock the blade assembly holder 20 in a fixed 'no impact' position, or to allow the holder to be axially translated as a result of being impacted by the hammer 80. For this purpose, the multi-position knob 40 is a generally cylindrically configured (molded plastic) element having a pair of spaced apart, generally quarter round or arcuate-shaped pegs 131 and 133.

Figure 4:
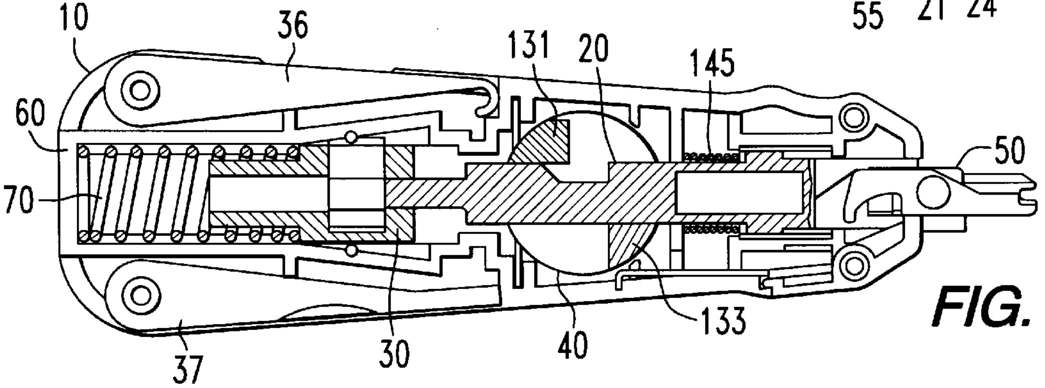
FIG. 4 is a diagrammatic side sectional view of the wire-insertion and cutting tool of FIG. 1, in which its adjustable stop is oriented for hammer impact operation.

When the multi-position knob 40 is rotated fully in a clockwise direction, as shown in FIG. 1, the arcuate surface 137 of peg 133 engages impact/non impact stop pin 140, and the arcuate surface 132 of peg 131 engages a depression 128 in the holder 20, restraining axial movement of the holder 20 toward the hammer, so that the solid shaft portion 22 of the tool blade assembly holder is unable to enter the hammer bore 83, preventing the hammer from 'firing'. Conversely, as shown in FIG. 4, when the multi-position knob 40 is rotated fully counterclockwise, the arcuate surface 132 of peg 131 engages an impact/non-impact stop pin 140, so that a generally planar surface 135 of peg 131 and a generally planar surface 136 of peg 132 form spaced apart side axial guide surfaces for sides the holder 20, thereby allowing the holder to be translated by the impact action of the hammer 80.

A forward wall portion 65 of the interior wall configuration of the handle 10 is further constructed to define a cavity 66, that is sized to receive the tool blade assembly-receiving portion 21 of the holder 20. A first end 144 of a holder return spring 145 that surrounds the tool blade assembly-receiving portion 21 of the holder 20 and abuts against a wall portion 146 of the interior wall configuration of the handle 10. A second end 147 of the return spring 145 abuts against an annular surface 148 of the tool blade assembly-receiving portion 21 of the holder 20. Return spring 145 is operative to normally urge the holder 20 in the forward axial direction of the tool (to the right as viewed in FIGS. 1–4). Forward axial translation of the holder 20 is limited by a forward annular edge surface 149 of the tool blade assembly-receiving portion 21 of the holder 20 abutting against a wall portion 151 of the interior wall configuration of the handle. The tool blade assembly-receiving portion 21 of the holder 20 has a forward axial bore 24, that is sized to receive a generally cylindrical shank portion 51 of the scissors-configured, cut/no-cut tool blade assembly 50 and a compression spring 52, surrounding the shank portion 51. A first side 150 of the tool blade-receiving portion 21 has a generally flat or planar surface, and a horizontal ledge 152, that is parallel to the axis 15 of the tool.

Where the tool blade assembly 50 of FIGS. 5 and 5A is used, its shank portion 51 is inserted into the axial bore 24, such that a rotatable cutting blade 54 of the tool blade assembly 50, which rotates by way of a pin 100, is juxtaposed to the first side 150 of the tool blade assembly receiving portion 21 of the holder 20. This corresponds to a 'no-cut' configuration of the tool. This no-cut orientation allows the first side 150 of tool blade-receiving portion 21 and a like flat surface 53 of a rotatable cutting blade 54 of the tool blade assembly 50 to move past one another, while the horizontal ledge 152 confines the movement of the rotatable cutting blade 54 to a direction that is parallel to the longitudinal axis 15.

A second side 170 of the tool blade assembly-receiving portion 21 of the holder 20 has a generally cylindrical surface 171 that intersects a generally flat or planar surface 172 along a tapered edge 173. The tapered edge 173 serves as a rotation guide ramp for an interior edge region 55 of the rotatable cutting blade 54, during relative axial translation between the blade assembly holder 20 and the blade assembly 50, for a 'cut' mode of operation of the tool.

In particular, in this 'cut' mode, with the blade assembly 50 engaging a wire to be seated in a termination block, as force is imparted axially by way of the hammer impact mechanism 30 through the holder 20 to the blade assembly 50, the blade assembly 50 and the holder 20 move axially toward one another, causing the tapered guide ramp 173 to engage the interior edge region 55 of the rotatable cutting blade 54. As the interior edge region 55 of the blade 54 'rides' along the tapered guide ramp 173 of the holder 20, the cutting blade 54 is caused to rotate past a stationary blade element 56 of the cutting blade assembly 50, severing the wire.

The rotatable cutting blade 54 is further configured to include a recess 154, which is adjacent to its interior edge region 55, so as to define a lip or pawl 156, which passes through a slot 157 in the holder 20, and is engaged by a first or forward end 161 of a pivotable blade assembly locking clip 160 pivotably mounted to a respective half-handle. A like pivotable locking clip is mounted to the other half-handle, so that a fully assembled handle contains a pair of locking clips on opposite sides of the forward end of the handle.

The forward end 161 of the locking clip 160 is engaged by a pawl 156 of rotatable cutting blade 54, when the locking clip is biased into its blade assembly-locking condition. Namely, by virtue of its forward end 161 engaging the pawl 156 of the blade assembly 50 in this blade assembly-locking condition, the locking clip 160 locks the blade assembly 50 into the holder bore 24.

Locking clip 160 is pivotable about a pin 162, and has a second end 164 engaging a compression spring 170, which is captured between a recess 172 in wall portion 174 and a recess 176 in the second end 164 of the locking clip. The second end 164 of the locking clip has a tab portion 169 that engages a 'clicker pin' 166. A second end 167 of the clicker pin 166 is bent to form a tang 168 that engages a hole 181 in a sidewall portion 148 of the handle 10, and thereby enables the clicker pin 166 to be flexibly retained in the sidewall portion 148 of the handle 10.

The clicker pin provides an audible 'clicking' sound to the tool user, when the clicker is flexed or snaps past the tab portion 169 of locking clip 160, as a result of the locking clip 160 being pinched by the craftsperson, so that it rotates about pin 162 by a distance that permits removal or insertion of the blade assembly 50 with respect to the holder bore 24. Once a blade assembly 50 has been inserted or removed, the clicker pin will again provide an audible click, when the tab portion 169 snaps back in the opposite direction, as the locking clip 160 is returned to its at rest position.

The compression spring 170 normally biases the second end 164 of the locking clip 160 in an outward direction (counter-clockwise, as viewed in FIG. 1). This outward biasing of its second end 164 pivots the locking clip 160, so as to bring a tab portion 169 thereof into engagement with a ridge 149 of the sidewall portion 148 of the handle 10, thereby defining the blade assembly-locking condition of the pivotable locking clip 160.

Figure 6:
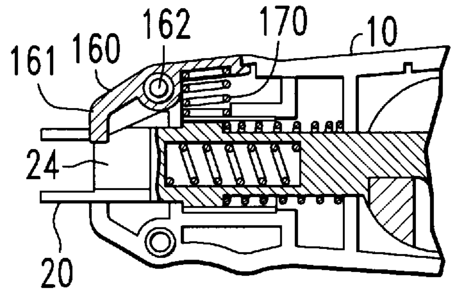
FIGS. 6–9 diagrammatically illustrate the manner in which a blade assembly is inserted into and captured in the bore of the holder of the tool of the invention.
Figure 7:
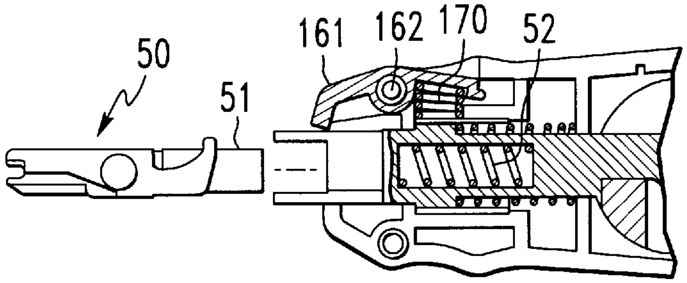
Figure 8:
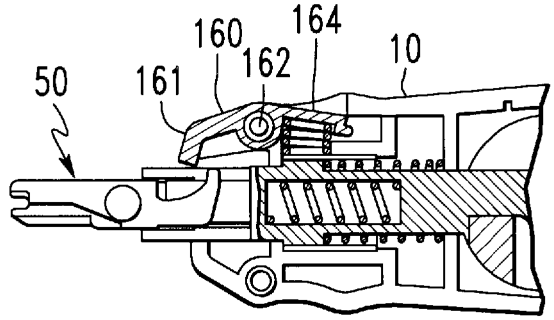
Figure 9:
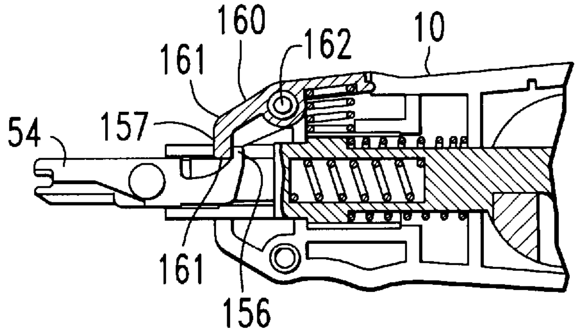

The manner in which a blade assembly 50 is inserted into and captured in the bore 24 of the holder 20 is diagrammatically illustrated in FIGS. 6–9. As shown in FIG. 6, to insert the blade, when the craftsperson manually squeezes the locking clip 160 against compression spring 170, the forward end 161 of the locking clip 160 pivots clockwise about pin 162, clearing bore 24. This allows insertion of the blade assembly 50, as shown in FIG. 7. With the shank portion 51 of the blade assembly 50 inserted into the compression spring within the holder bore 24, pressure against the second end 164 of locking clip 160 is released, so that the compression spring 170 rotates the forward end 161 of the locking clip clockwise through the slot 157 in the holder 20, and into the recess 154 of the rotatable blade 54, as shown in FIG. 8. In this condition, the compression spring 52 biases the blade assembly outwardly of bore 24 of the holder 20, so that pawl 156 is engaged by the forward end 161 of the blade locking clip 160, thereby locking the blade assembly 50 into the holder bore 24 (FIG. 9.)

To remove the blade assembly 50 from the handle 10, the craftsperson again manually squeezes the second end 164 of locking clip 160 against the compression spring 170, causing the forward end 161 of the locking clip to pivot clockwise about pin 162, clearing bore 24, allowing removal of the blade assembly 50, as shown in FIG. 7. The craftsperson then releases pressure against the second end 164 of locking clip 160 is released, so that the compression spring 170 rotates the forward end 161 of the locking clip clockwise through the slot in the holder 20, as shown in FIG. 6.

Figure 10:
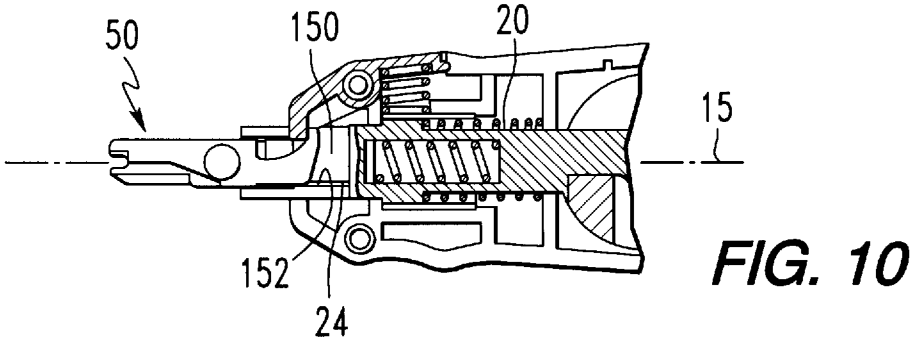
FIGS. 10–12 show the operation of the tool of the invention for a first, 'no-cut' insertion orientation of a blade assembly.
Figure 11:
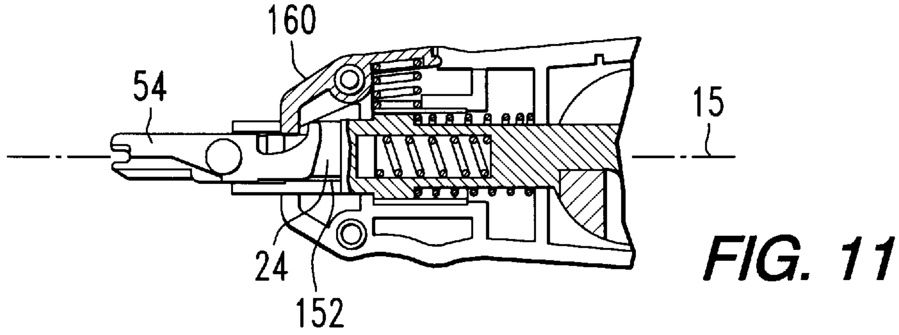
Figure 12:
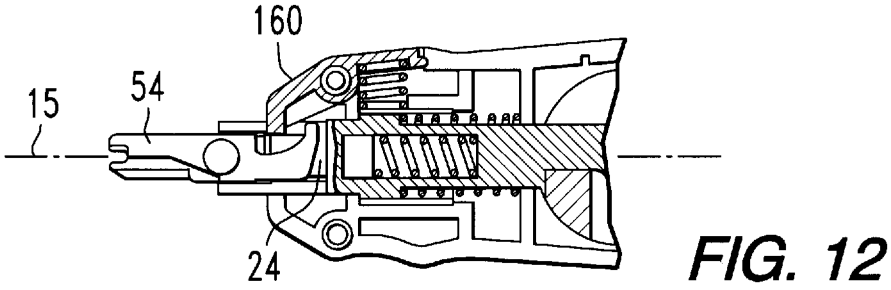
Figure 13:
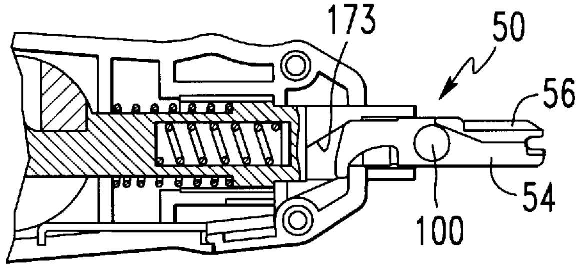
FIGS. 13–16 show the operation of the tool of the invention for a second, 'cut' insertion orientation of a scissors type blade assembly.
Figure 14:
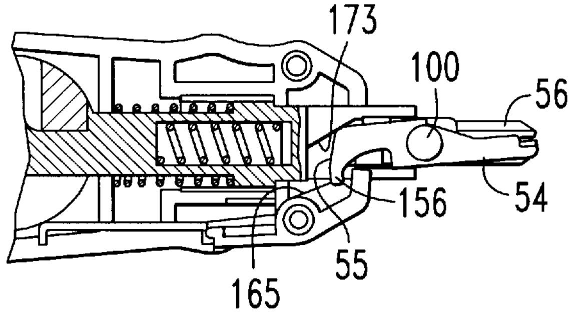
Figure 15:
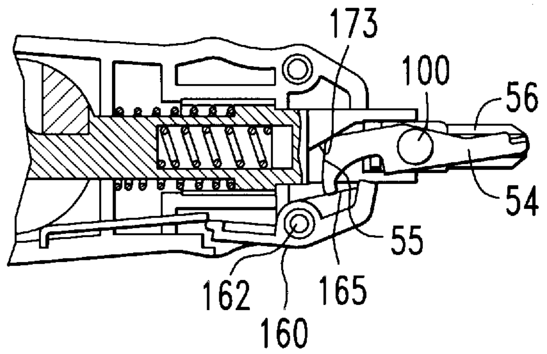
Figure 16:
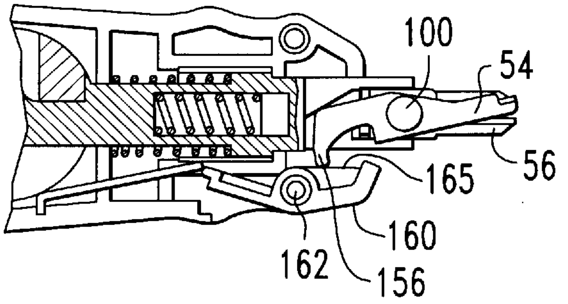

As pointed out above, an inserted blade assembly 50 operates in a selected one of a 'cut' or a 'no-cut' mode, in accordance with the orientation of the blade assembly as inserted into the bore 24 of the holder 20. In particular, in a first 'no-cut' insertion orientation, the blade assembly 50 is inserted into the holder bore 24 such that the cutting blade 54 is juxtaposed to the first 'flat' side 150 of the blade assembly-receiving portion 21 of the holder 20, as diagrammatically shown in FIG. 10. In this no-cut insertion orientation, as force is axially imparted to the holder 20, the rotatable cutting blade 54 of the blade assembly 50 moves past the flat side 150 of the holder, and the horizontal ledge 152 confines the movement of the cutting blade 54 to a direction that is parallel to the longitudinal axis 15, preventing rotation of the cutting blade 54, as shown in the sequence of FIGS. 11 and 12. As a consequence of this no-rotation translation, the cutting blade assembly 50 will 'seat' the wire without cutting it.

In a second, 'cut' insertion orientation of the blade assembly 50, the blade assembly 50 is rotated 180° about axis 15, so that, with shank portion 51 of the blade assembly 50 inserted into the holder bore 24, the interior edge region 55 of the rotatable cutting blade 54 will be located on the same side of the holder as its tapered edge 173. As a consequence, as shown in the cut mode sequence of FIGS. 13–16, during relative movement of the blade assembly 50 toward the tapered edge 173 of holder 20, the tapered guide ramp 173 will engage the interior edge region 55 of the rotatable cutting blade 54, as the interior edge region 55 of the blade 54 'rides' along the tapered guide ramp 173 of the holder 20, thereby effecting a 'scissor' type rotation of the cutting blade 54 about pivot pin 100 past the stationary blade element 56 of the cutting blade assembly 50, and severing a wire engaged by the blade assembly. During this rotation of the blade 54, the pawl 156 pushes against surface 165 of locking clip 160, causing locking clip 160 to rotate about pivot pin 162, as shown.

Figure 17:
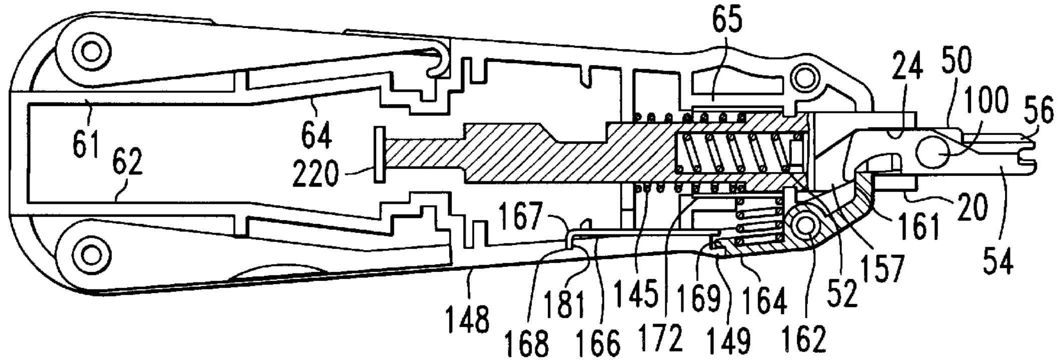
FIG. 17 diagrammatically illustrates a second, non-impact, embodiment of a wire-insertion and cutting tool in accordance with the present invention.

FIG. 17 diagrammatically illustrates a second, non-impact, embodiment of the wire-insertion and cutting tool in accordance with the present invention. As shown therein, in this second embodiment, the spring-loaded, axially translatable, impact hammer mechanism 30 and the multi-position knob 40 of the first embodiment are not employed. Instead, a stop 220 is installed within the interior bore of the handle, so that the rearward, solid shaft end portion 83 thereof abuts against the stop. Also, there is no impact return spring in the second embodiment. The remaining components of the second embodiment are the same as those of the first embodiment, described above.

Loading and unloading a blade assembly 50 of FIGS. 5 and 5A relative to the handle of the second embodiment of the handle are the same as the first embodiment, so that a cut or no-cut operation will depend upon the insertion orientation of the blade assembly into the holder. Since the stop 220 is fixed in place within the handle, the force applied to the blade assembly 50 by the stop 220 is that manually imparted by a craftsperson gripping the handle 10, similar to the case for the holder locking position of the knob 40 in the first embodiment, described above.

FIGS. 18–20 diagrammatically illustrate a no-cut, wire-insertion type of tool blade assembly 250 which, like the tool blade assembly 50 of FIGS. 5 and 5A, described above, has a generally cylindrical shank portion 251, that is insertible into the bore 24 of the tool blade receiving portion 21 of the holder 20. However, unlike the tool blade assembly 50 of FIGS. 5 and 5A, the tool blade assembly 250 of FIGS. 18–20 has no rotatable cutting blade.

Instead, it has a generally elongated, rectangular C-shaped wire insertion and seating blade head, shown at 254, which is solid with and projects from a generally cylindrically shaped neck portion 256 of the blade assembly. In order to seat a wire and engage a terminal block, the wire insertion and seating blade head 254 has an end slot 255, and a deeper elongated U-shaped channel 257 orthogonal to end slot 255. The blade's neck portion 256 is solid with a first face 258 of a base 260, from an opposite face 259 of which the generally cylindrical shank portion 251 extends.

The base 260 of blade assembly 250 is configured to include a pawl 256 solid therewith. Like pawl 156 of the blade assembly 50 of FIGS. 5 and 5A, pawl 256 of the blade assembly 250 of FIGS. 18–20 is engageable by a forward end 161 of one of the two blade locking clips 160 (as pivotably rotated by a pinching opening and closing action of the craftsperson), so as to lock the blade assembly 250 into the holder bore 24, for either of two (180° rotationally offset) orientations in which the tool blade assembly 250 may be been inserted into the holder 20.

Namely, the blade assembly 250 may be inserted into the holder bore 24 such that a flat top portion 262 of the base 260 is juxtaposed to the horizontal ledge 152 of the blade assembly-receiving portion 21 of the holder 20. In a 180° orientation of the blade assembly 250, a bottom flat portion 264 of the base 260 will be juxtaposed to horizontal ledge 152 of the blade assembly-receiving portion 21 of the holder 20. In either orientation, pawl 256 will be engaged by the forward end 161 of one of the two blade locking clips 160. As a consequence, for either of these two orientations, the blade head 254 will 'seat' the wire without cutting it.

As will be appreciated from the foregoing description, the above described deficiencies of conventional wire insertion tools, including both non-impact and impact designs, are effectively obviated in accordance with the 'broad spectrum' wire-insertion and cutting tool of the present invention, which is configurable as either an impact or manual force based device, and can accept a variety of different types of blades, each of which can be operated in either seat only, or seat and cut mode, and is configured in accordance with a given type of cutting and insertion blade that is intended for use with a respective type of terminal block. This significantly reduces the equipment inventory requirements of the craftsperson, who, rather than having to carry a large number of complete tools, needs only keep an inventory of the different types of blade assemblies that may be required for the various terminal blocks to be serviced.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. A wire-insertion and cutting tool comprising:

a handle containing a wire-insertion and cutting blade assembly holder; and a wire-insertion and cutting blade assembly, which engages said holder, and having a wire-insertion and cutting blade, which is configured to engage a wire to be inserted into a wire receptacle, and is controllably operative to cut said wire in accordance with the orientation of said blade assembly relative to said holder, wherein said wire-insertion and cutting blade assembly has a cutting blade that is rotatable about an axis, and wherein said holder is configured to cause said cutting blade to rotate about said axis and cut a wire engaged thereby, for a first orientation of said blade assembly relative to said holder, and to prevent said cutting blade from rotating about said axis for a second orientation of said blade assembly relative to said holder.

2. A wire-insertion and cutting tool according to claim 1, wherein said blade assembly is axially translatable relative to said holder, and wherein said holder has a ramp surface which, for said first orientation of said blade assembly relative to said holder, engages said cutting blade during axial translation of said holder relative to said blade assembly, and causes said cutting blade to rotate about said axis and cut a wire engaged by said blade assembly.

3. A wire-insertion and cutting tool according to claim 2, and wherein said holder is configured such that said ramp surface thereof, for said second orientation of said blade assembly relative to said holder, cannot engage said cutting blade during axial translation of said holder relative to said blade assembly, so that said cutting blade does not rotate about said axis and cut a wire engaged by said blade assembly.

4. A wire-insertion and cutting tool according to claim 1, wherein said blade assembly is axially translatable relative to said holder, and wherein a first portion of said holder has a ramp surface which, for said first orientation of said blade assembly relative to said holder, engages a first portion of said cutting blade during axial translation of said blade assembly relative to said holder, and causes said cutting blade to rotate about said axis and cut a wire engaged by said cutting blade assembly, and wherein a second portion of said holder is exclusive of a ramp surface that would otherwise engage said first portion of said cutting blade, so that, for said second orientation of said blade assembly relative to said holder, said first portion of said cutting blade does not engage said second portion of said holder, during axial translation of said cutting blade assembly relative to said holder, so that said cutting blade does not rotate about said axis and cut a wire engaged by said cutting blade assembly.

5. A wire-insertion and cutting tool according to claim 4, wherein said first and second orientations are respective holder engagement rotational orientations of said cutting blade assembly about an axis of said wire-insertion and cutting tool holder.

6. A wire-insertion and cutting tool comprising:

a handle containing a wire-insertion and cutting blade assembly holder; and a wire-insertion and cutting blade assembly, which engages said holder, and having a wire-insertion and cutting blade, which is configured to engage a wire to be inserted into a wire receptacle, and is controllably operative to cut said wire in accordance with the orientation of said blade assembly relative to said holder, wherein said holder comprises a generally longitudinal shaft having a bore at a first end portion thereof for receiving said blade assembly, and wherein said blade assembly comprises a fixed blade element that is insertible into said bore of said first end portion of said generally longitudinal shaft, and a rotatable blade element that is rotatably attached to said fixed blade element, and is arranged to engage and be rotated by said holder for a first insertion orientation of said fixed blade element into said bore of said first end portion of said generally longitudinal shaft.

7. A wire insertion and cutting tool comprising:

a handle containing a wire-insertion and cutting blade assembly holder; and a wire-insertion and cutting blade assembly, which engages said holder, and having a wire-insertion and cutting blade, which is configured to engage a wire to be inserted into a wire receptacle, and is controllably operative to cut said wire in accordance with the orientation of said blade assembly relative to said holder, wherein said handle has a longitudinal axial bore defined by interior walls of said handle and is configured to receive said holder, such that a blade assembly receiving portion of said holder projects from a forward end of said handle, and wherein said longitudinal axial bore of said handle contains a spring-loaded, axially translatable, impact hammer mechanism, that is controllably operative to impart an impact force to said holder, and thereby cause said blade assembly to seat a wire engaged thereby, and wherein said holder has a forward axial bore sized to receive a shank portion of said blade assembly, and wherein a first side of said holder has a generally flat surface parallel to an axis of said tool, that is juxtaposed to a rotatable cutting blade of said blade assembly for a first, no-cut orientation of said blade assembly as inserted into said holder.

8. A wire insertion and cutting tool according to claim 7, wherein said holder is configurable to confine the movement of said rotatable cutting blade in a direction parallel to said axis.

9. A wire insertion and cutting tool according to claim 7, wherein a second side of said holder has a ramp surface that engages and causes rotation of said rotatable cutting blade, during relative axial translation between said holder and said blade assembly for a second, cut orientation of said blade assembly as inserted into said holder.

10. A wire insertion and cutting tool according to claim 7, wherein said rotatable cutting blade is engaged by a tool locking clip pivotably mounted to said handle, for locking said blade assembly in said holder.

11. A wire-insertion tool comprising:

a handle containing a wire-insertion blade assembly holder, and an impact mechanism which is selectively operative to engage and impart an impact force to said wire-insertion blade assembly holder, and thereby to a wire engaged by a wire-insertion blade assembly installed in said wire-insertion blade assembly holder;

a wire-insertion blade assembly, which engages said wire-insertion blade assembly holder, and having a wire-insertion blade, which is configured to engage a wire to be inserted into a wire receptacle, and is controllably operative to seat said wire; and a multi-position switch, which is configured to allow said impact mechanism to impart an impact force to said wire-insertion blade assembly holder for a first position of said switch, and to prevent said impact mechanism from imparting said impact force to said wire-insertion blade assembly holder for a second position of said switch, and wherein said wire-insertion blade assembly has a cutting blade that is rotatable about an axis, and wherein said wire-insertion blade assembly holder is configured to cause said cutting blade to rotate about said axis and cut a wire engaged thereby, for a first orientation of said blade assembly relative to said wire-insertion blade assembly holder, and to prevent said cutting blade from rotating about said axis for a second orientation of said blade assembly relative to said wire-insertion blade assembly holder.

12. A wire-insertion tool according to claim 11, wherein said first and second orientations are respective holder engagement rotational orientations of said cutting blade assembly about an axis of said wire-insertion blade assembly holder.

13. A wire-insertion tool comprising:

a handle having an axial bore;

a wire-insertion blade assembly holder installed in said axial bore of said handle; and a wire-insertion blade assembly, insertible into said holder in a plurality of blade assembly insertion orientations, and having a wire-insertion blade, which is configured to engage a wire to be inserted into a wire receptacle, and is operative to seat said wire irrespective of its blade assembly insertion orientation, and wherein said wire-insertion blade assembly has a rotatable cutting blade, and wherein said holder is configured to rotate said cutting blade and cut a wire engaged thereby, for a first insertion orientation of said blade relative to said holder, and to prevent said cutting blade from rotating for a second insertion orientation of said blade assembly relative to said holder.

14. A wire-insertion tool comprising:

a handle having an axial bore;

a wire-insertion blade assembly holder installed in said axial bore of said handle; and a wire-insertion blade assembly, insertible into said holder in a plurality of blade assembly insertion orientations, and having a wire-insertion blade, which is configured to engage a wire to be inserted into a wire receptacle, and is operative to seat said wire irrespective of its blade assembly insertion orientation, wherein said wire-insertion blade assembly is configured to seat a wire engaged thereby, without cutting said wire, for either of a first insertion orientation of said blade relative to said holder, or a second insertion orientation of said blade assembly relative to said holder, and wherein said blade assembly includes a pawl solid therewith, that is engageable by a blade assembly locking clip of said handle, so that said blade assembly is locked into said handle for either of said first and second insertion orientations of said blade assembly relative to said holder.

15. A wire-insertion and cutting blade assembly for engaging a wire to be inserted into a wire receptacle and being installable in a wire-insertion and cutting tool having a handle, said handle containing a wire-insertion and cutting blade assembly holder, said blade assembly comprising:

a stationary blade member that is configured to engage and be supported by way of said wire-insertion and cutting blade assembly holder in a selected one of a plurality of orientations relative to said holder; and a rotatable cutting blade, which is rotatably attached to said stationary blade member, and is configured to engage said holder and cut said wire or not cut said wire in accordance with the orientation of said blade assembly relative to said holder.

16. A wire-insertion and cutting blade assembly according to claim 15, wherein said holder is configured to cause said rotatable cutting blade to rotate about an axis and cut a wire engaged thereby, for a first orientation of said blade assembly relative to said holder, and to prevent said rotatable cutting blade from rotating about said axis for a second orientation of said blade assembly relative to said holder.

17. A wire-insertion and cutting blade assembly according to claim 16, wherein said blade assembly is axially translatable relative to said holder, and wherein said holder has a ramp surface which, for said first orientation of said blade assembly relative to said holder, engages said rotatable cutting blade during axial translation of said holder relative to said blade assembly, and causes said rotatable cutting blade to rotate about said axis and cut a wire engaged by said blade assembly.

18. A wire-insertion and cutting blade assembly according to claim 17, and wherein said holder is configured such that said ramp surface thereof, for said second orientation of said blade assembly relative to said holder, cannot engage said rotatable cutting blade during axial translation of said holder relative to said blade assembly, so that said rotatable cutting blade does not rotate about said axis and cut a wire engaged by said blade assembly.

19. A wire-insertion and cutting blade assembly according to claim 16, wherein said blade assembly is axially translatable relative to said holder, and wherein a first portion of said holder has a ramp surface which, for said first orientation of said blade assembly relative to said holder, engages a first portion of said cutting blade during axial translation of said blade assembly relative to said holder, and causes said rotatable cutting blade to rotate about said axis and cut a wire engaged by said cutting blade assembly, and wherein a second portion of said holder is exclusive of a ramp surface that would otherwise engage said first portion of said rotatable cutting blade, so that, for said second orientation of said blade assembly relative to said holder, said first portion of said rotatable cutting blade does not engage said second portion of said holder, during axial translation of said rotatable cutting blade assembly relative to said holder, so that said rotatable cutting blade does not rotate about said axis and cut a wire engaged by said cutting blade assembly.

20. A wire-insertion and cutting blade assembly according to claim 19, wherein said first and second orientations are respective holder engagement rotational orientations of said cutting blade assembly about an axis of said wire-insertion and cutting tool holder.

21. A wire insertion and cutting blade assembly according to claim 20, wherein said holder is configurable to confine the movement of said rotatable cutting blade in a direction parallel to said axis.

22. A wire-insertion blade assembly for engaging a wire to be inserted into a wire receptacle and being installable in a wire-insertion tool having a handle, said handle containing a wire-insertion blade assembly holder, said blade assembly comprising:

a first stationary blade member that is configured to engage and be supported by way of said wire-insertion blade assembly holder in a selected one of a plurality of orientations relative to said holder; and a second stationary blade member, which is fixedly attached to said stationary blade member, and is configured to engage said holder and seat said wire irrespective of the orientation of said blade assembly relative to said holder, and including a pawl that is engageable by a blade assembly locking clip of said handle, so that said blade assembly is locked into said handle for either of first and second insertion orientations of said blade assembly relative to said holder.

23. A wire-insertion blade assembly according to claim 22, wherein said first and second orientations are respective holder engagement rotational orientations of said blade assembly about an axis of said wire-insertion tool holder.

24. A wire insertion blade assembly according to claim 23, wherein said holder is configurable to confine movement of said blade in a direction parallel to said axis.

* * * * *